W. A. KUHLMAN.
METAL HARNESS.
APPLICATION FILED JULY 1, 1908.
909,612.
Patented Jan. 12, 1909.
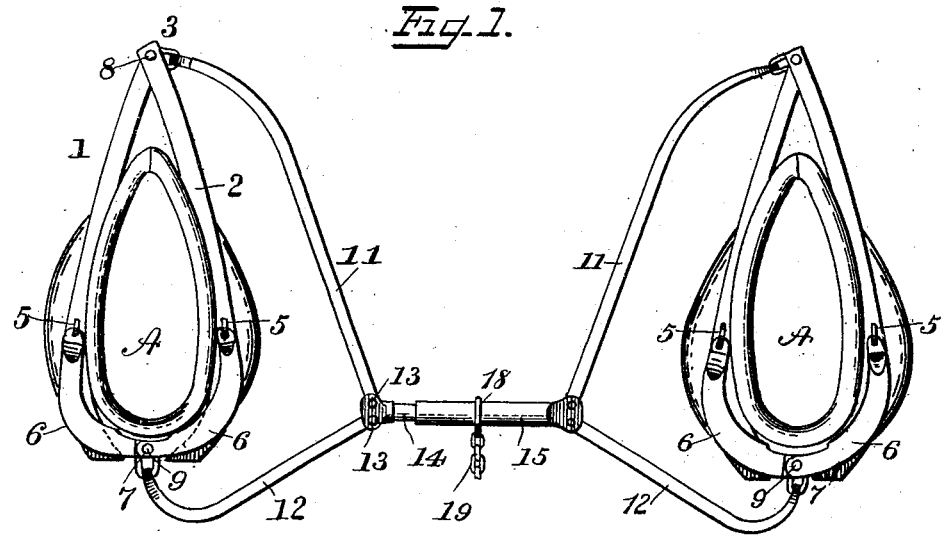
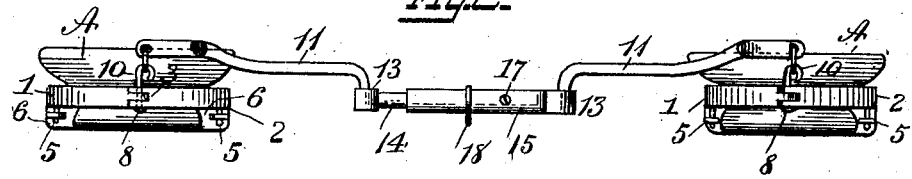
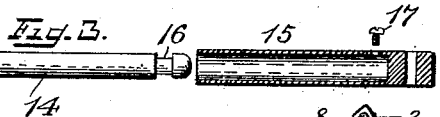
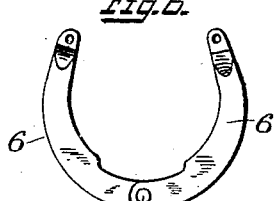
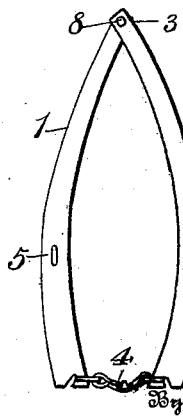

UNITED STATES PATENT OFFICE.

WILLIAM A. KUHLMAN, OF TOLEDO, OHIO.

METAL HARNESS.

No. 909,612.  Specification of Letters Patent.  Patented Jan. 12, 1909.

Application filed July 1, 1908. Serial No. 441,483.

*To all whom it may concern:*

Be it known that I, WILLIAM A. KUHLMAN, a citizen of the United States, residing at Toledo, in the county of Lucas and State of Ohio, have invented certain new and useful Improvements in Metal Harness, of which the following is a specification.

My invention relates to an improvement in metal harnesses more particularly adapted for plowing or logging, where two or more draft animals are harnessed together without the necessity of tongue, pole or double-trees.

My invention further consists in certain novel features of construction and combinations of parts which will be hereinafter described and pointed out in the claims.

In the accompanying drawings:—Figure 1 is a view in front elevation illustrating my invention applied to two ordinary horse collars, and, Fig. 2 is a plan view, and, Figs. 3, 4, and 5 are details.

A, represents ordinary horse collars; 1 and 2 are metal hames hinged together at the upper end as at 3, and connected together at the lower end by a strap or other approved fastening means 4. Hooked to these hames by hooks 5, 5, or otherwise, are the jointed U-shaped yokes 6, 6, preferably composed of two pieces hinged together as at 7.

The bolts 8 and 9 which hinge the parts together at the top and bottom of the hames are preferably provided with hook-shaped inner ends 10, 10. To these hooks the arms 11 and 12 are loosely connected. The opposite ends of these arms come together and are pivotally connected as at 13, 13, to the outer ends of the adjustable telescopic connecting bar which connects the draft animals together. This connecting bar is preferably composed of two sections 14 and 15 as shown detached in Figs. 3 and 4, and together in Figs. 1 and 2, one of which slides into the other, the inner one being provided with a circumferential groove or notch 16 which receives the set screw 17 whereby they are held together against separation while admitting of axial turning, one with respect to the other. A ring, hook, or other device 18 may be connected with this bar in any approved manner at or near its center, and to this, a chain 19 or other approved draft appliance is attached.

The foregoing constitute the main elements of my present invention, and it will be observed that the parts of the harness are reduced to a minimum, while at the same time they are strong, easily and quickly applied to a collar, or removed therefrom, capable of quick adjustment, and effectual in the performance of their functions, and by the use of hooks of this character, the entire draft is brought equally upon the shoulders of the draft animals, tugs are dispensed with as well as whiffletrees, tongues, and the like. The parts being hinged or suspended as it were at the upper and lower ends of the collars, and also hinged or pivoted to the connecting cross bar, they yield readily to the movements of the animals' shoulders, thus removing friction and strain, and equalizing to a very large degree, the element of pulling strain.

It is evident that more or less slight changes might be made in the form and arrangement of the several parts described without departing from the spirit and scope of my invention, and hence I do not wish to limit myself to the exact construction herein set forth.

Having fully described my invention, what I claim as new and desire to secure by Letters Patent, is:—

1. The combination with jointed hames and jointed U-shaped yokes pivotally connected therewith, of arms loosely connected at the joints of the hames and yokes respectively, and a connecting bar hinged or pivotally connected with said arms.

2. The combination with jointed hames and jointed U-shaped yokes pivotally connected therewith, of arms loosely connected at the joints of the hames and yokes respectively, and a connecting bar hinged or pivotally connected with said arms, said connecting bar composed of separable parts.

3. The combination with hames hinged together at their upper ends and adapted to embrace horse collars, jointed U-shaped yokes pivotally connected at the upper end with the hames, hooks connected with the upper ends of the hames and the lower ends of the jointed yoke, arms detachably connected with said hooks, and a cross-bar to which said arms are hinged or pivoted.

4. The combination with hames hinged together at their upper ends and adapted to embrace horse collars, jointed U-shaped yokes pivotally connected at the upper end with the hames, hooks connected with the upper ends of the hames and the lower ends of the jointed yoke, arms detachably connected with said hooks, and a cross-bar to which said arms are hinged or pivoted, said connecting bar composed of separable parts.

In testimony whereof I affix my signature in presence of two witnesses.

WILLIAM A. KUHLMAN.

Witnesses:
Thos. L. Gifford,
Corydon W. Munson.